United States Patent [19]

Wetzel et al.

[11] Patent Number: 4,761,873
[45] Date of Patent: Aug. 9, 1988

[54] METHOD OF MANUFACTURING A HOSE STEM FOR HYDRAULICALLY LOADED FRICTION FITTINGS OR THREADED FITTINGS

[75] Inventors: Hans J. Wetzel, Baden-Baden; Bernd Matuszczak, Sasbach, both of Fed. Rep. of Germany

[73] Assignee: Aeroquip GmbH, Baden-Baden, Fed. Rep. of Germany

[21] Appl. No.: 2,700
[22] PCT Filed: May 10, 1986
[86] PCT No.: PCT/EP86/00277
§ 371 Date: Dec. 17, 1986
§ 102(e) Date: Dec. 17, 1986
[87] PCT Pub. No.: WO86/06813
PCT Pub. Date: Nov. 20, 1986

[30] Foreign Application Priority Data
May 11, 1985 [DE] Fed. Rep. of Germany ....... 3517163

[51] Int. Cl.⁴ ............................................. B21D 39/00
[52] U.S. Cl. .................................... 29/517; 29/157 R; 72/370
[58] Field of Search ............... 29/157 R, 33 D, 33 T, 29/157 T, 515, 517; 72/376, 370

[56] References Cited

U.S. PATENT DOCUMENTS

| | | | |
|---|---|---|---|
| 1,265,709 | 5/1918 | Dies | 72/370 X |
| 1,980,264 | 11/1934 | Giesler | 72/367 X |
| 4,452,063 | 6/1984 | Sebastiani et al. | 72/367 X |
| 4,625,537 | 12/1986 | Aleck | 72/367 |

FOREIGN PATENT DOCUMENTS 358546 10/1938 Italy ..................... 72/367

Primary Examiner—P. W. Echols
Assistant Examiner—Irene Cuda
Attorney, Agent, or Firm—Max Fogiel

[57] ABSTRACT

Method of manufacturing a hose stem for hydraulically loaded friction fittings or threaded fittings. A hose stem of this type has a stem end that a hose can fit over, a securing component that accepts the connection, and a joining pipe. The surface of the end of the stem is shaped to position the hose securely and the securing component has a groove for securing the connection. The hose stem (2) is manufactured along with its end (2), securing component (4), and joining pipe (5) by cold forming out of a continuous length (1) of pipe.

15 Claims, 3 Drawing Sheets

METHOD OF MANUFACTURING A HOSE STEM FOR HYDRAULICALLY LOADED FRICTION FITTINGS OR THREADED FITTINGS

The invention concerns a method of manufacturing a hose stem for hydraulically loaded friction fittings or threaded fittings, with a stem end that a hose can fit over, a securing component that accepts the connection, and a joining pipe, whereby the surface of the end of the stem is shaped to position the hose securely and the securing component has a groove for securing the connection. A hose stem is to be understood as the part of a friction or threaded fitting that has a stem end, a securing component, and a joining pipe. The invention relates to hose stems that are subjected to pressure from a medium. The connection can be established with the hose stem by inserting one part straight into another or by screwing one threaded part into another.

One known method of manufacturing a hose stem involves two starting components. The stem end and the securing component are machined, turned and drilled that is, from a solid piece of material, metal for instance. It is possible in this way to shape the piece of material in any way desired by different types of processing. There is a drawback, however, in that most of the material ends up in the form of chips, with the final shape often accounting for only a third of the original blank. Since the second starting component in this manufacturing method is a joining pipe welded onto the end of the securing component that is remote from the stem end, some of the starting material already consists of a pipe.

The purpose of the joining pipe is to accept a sealing head, a connecting branch, a flange connector, or a similar connector if desired, although it can in the final analysis constitute the hose stem without a connector. Hose stems for conveying and conducting hydraulic media are, as is known, manufactured in a light and in a heavy version. What differentiates the two versions are the different diameters and wall thicknesses of the joining pipe. The same stem dimensions, however, are employed, meaning that the geometrical measurements of the stem end and securing component are identical for the light and for the heavy versions. The only difference is in the soldering bore at the free end of the securing component, depending on whether a light or a heavy joining pipe is to be soldered on.

Manufacturing hose stems by welding them together from three components is also known. The first component to be manufactured, by machining pipe material, is the stem end. The second component, the securing component, is machined from a solid piece. The third component is the joining pipe, one type for the heavy version and one for the light. When the components are assembled, when, that is, the hose stem is manufactured, the three components are butt welded together. Although manufacturing a hose stem from three components does result in less waste due to the exploitation of piping for the stem end, the method does demand additional welding between the securing component and the stem end. Butt welding the three componets together also produces at least two elevated welding beads on the inner surface of the hose stem, which decrease the pressure on the medium. The multiplicity of components in different embodiments demands the maintenance of a large stock if they are to be supplied rapidly.

The object of the invention is to improve and simplify a method of manufacturing a hose stem of the type initially described to the extend that the hose stem can be manufactured more economically than heretofore.

This object is attained in accordance with the invention in that the hose stem is manufactured along with its end, securing componet, and joining pipe by cold forming out of a continuous length of pipe. This method of manufacture not only utilizes the material better but also eliminates the need to fasten and especially to weld separate components together, so that the channel through the hose stem is not constricted by welding beads. The result is a ready supply of parts from a reduced and simplified stock because hose stems that can be employed with either light or heavy piping and with accordingly unaltered dimensions can generally be manufactured. This is also partly due to cold forming resulting in greater usable material strength.

The end of the hose stem is in a practical way shaped out of the length of pipe by decreasing its diameter and the engagement groove shaped at the securing component also by decreasing its diameter. The length of pipe can remain unshaped in the vicinity of the joining pipe. Shaping is, however, practical when the light version of the hose stem is employed. The diameter of the piping must not, however, be lengthened in any case, but reduced in conjunction with cold compacting.

A heavy version of the length of pipe can be utilized to manufacture either the heavy or the light version of the hose stem, and the free end of the joining pipe can if desired by shaped by decreasing its diameter. Thus hose stems in both versions can be manufactured in this way and by this means from pipe lengths in the heavy version.

The cold forming can be carried out by swaging, rolling, drawing through cones, etc. These processes, which are known in other fields, although not in the manufacture of hose stems, can be employed to obtain the not inconsiderable changes in the diameters of pipe sections, and to obtain them at the requisite manufacturing tolerances, that have hitherto demanded machining. The method in accordance with the invention is therefore also surprisingly simple.

The pipe length employed can be one with an outer cross-section in the form of a hexagon. This is especially practical when the hose stem is also intended to be hexagonal at some point, as in the vicinity of a connecting branch that is continuous with the joining pipe. Generally, however, a pipe length with round inside and outside sections is employed.

The free end of the joining pipe can be initially cold formed and then machined to create a sealing head, connecting branch, or similar structure. This is particularly practical for simplifying stock maintenance because the machining can be carried out to specifications just before the part is shipped.

The joining pipe can consist of the free end of the securing component, with a separately manufactured sealing head, connecting branch, or similar structure welded onto it if desired. The joining pipe can accordingly be very short or even by absent if the stem that is to be manufactured is axially very short.

It is also possible to initially machine a sealing head, connecting branch, or similar structure onto the pipe length before cold forming the rest of the length, creating in particular the securing component and the joining pipe. This procedure however, does have a drawback in that the type of sealing head, connecting branch, or similar structure must be allowed for ahead of time, which complicates the stock problem.

It is also possible to cold form the pipe length into a semifinished piece and finish it by machining a sealing head, connecting branch, or similar structure in the vicinity of the joining pipe. In this case the semifinished hose stem is stocked and the final machining can be carried out comparatively rapidly.

The new method of manufacture will now be specified and illustrated with reference to various embodiments by way of example.

Figure 4:
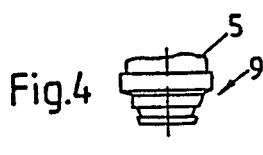
Figure 5:
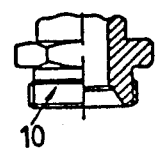
Figure 6:
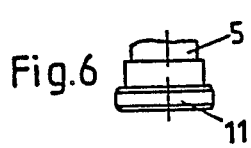
Figure 7:
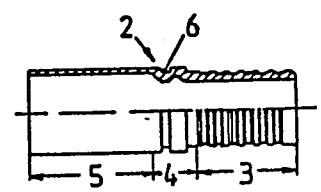
Figure 8:
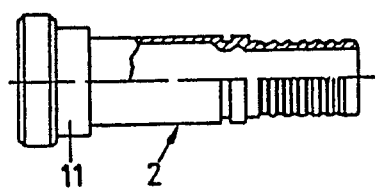
Figure 9:
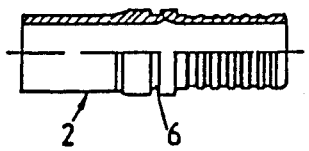
Figure 10:
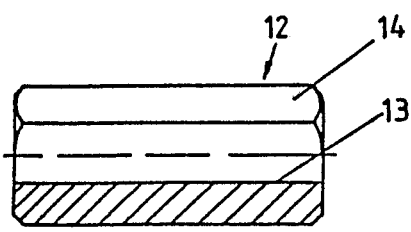
Figure 11:
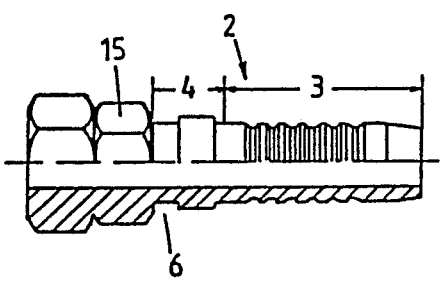
Figure 12:
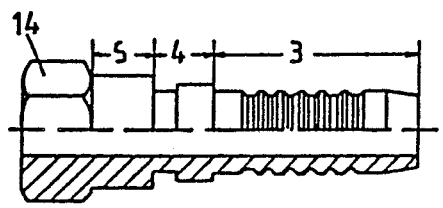
Figure 13:
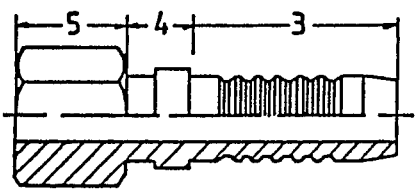
Figure 14:
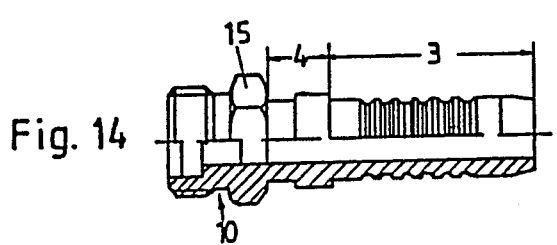
Figure 15:
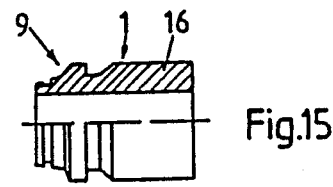
Figure 16:
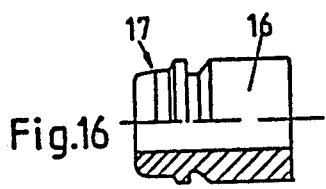
Figure 17:
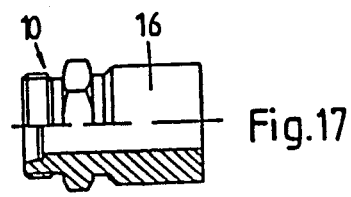
Figure 18:
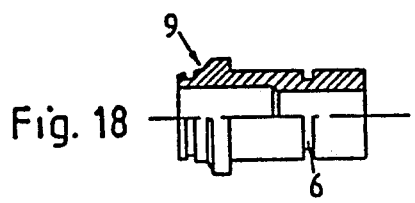
Figure 19:
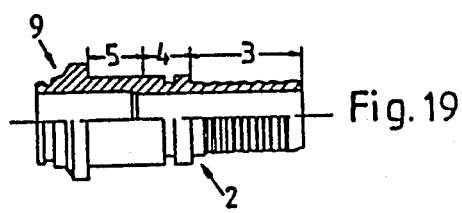

FIG. 4 is a view of a sealing head that can be formed onto the end of the joining pipe, FIG. 5 illustrates a connecting branch on the end of the joining pipe, FIG. 6 illustrates a flange connector on the end of the joining pipe, FIG. 7 illustrates another embodiment of the hose stem, FIG. 8 illustrates a hose stem with a flange connector formed onto it, FIG. 9 illustrates another hose stem, FIG. 10 illustrates a length of pipe employed as a starting material, FIG. 11 illustrates a hose stem in the form of a semifinished piece obtained from the pipe length illustrated in FIG. 10, FIG. 12 illustrates another hose stem in the form of a semifinished piece, FIG. 13 illustrates still another hose stem in the form of a semifinished piece, FIG. 14 illustrates a finished hose stem obtained from the semifinished piece illustrated in FIG. 11, FIG. 15 illustrates another hose stem at an intermediate stage of manufacture, FIG. 16 is a view similar to that in FIG. 15, FIG. 17 illustrates another hose stem in the form of a semifinished piece, FIG. 18 illustrates the hose stem in FIG. 15 subsequent to another intermediate stage of manufacture, and FIG. 19 illustrates the hose stem in FIGS. 15 and 18 in its finished state.

Figure 1:
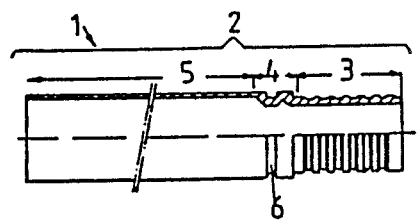
FIG. 1 is a half section through one embodiment of a finished hose stem.
Figure 2:
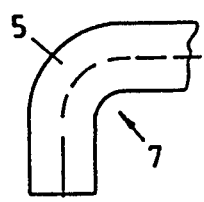
FIG. 2 illustrates a joining pipe in the form of an elbow for heavy versions.
Figure 3:
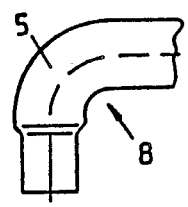
FIG. 3 illustrates a joining pipe in the form of an elbow for light versions.

FIG. 1 illustrates an already partly cold formed length 1 of pipe, which can be supplied as is as a finished hose stem 2. Hose stem 2 has a stem end 3, a securing component 4, and a joining pipe 5. The outer surface of stem end 3 is provided in a known way with grooves and depressions for securing the hose. Stem end 3 is inserted at that point into a hose and secured with an unillustrated friction or threaded fitting. If the fitting is a friction fitting, securing component 4 will have a groove 6 that is engaged by a collar on the fitting. The radial dimensions of joining pipe 5 match those of pipe length 1, which is accordingly not formed at that point. Joining pipe 5 can be of many different lengths, depending on specifications and installation conditions. it is also possible to include elbows of various angles. FIG. 2 illustrates a 90° elbow 7 with a joining pipe 5 for heavy versions formed onto it. FIG. 3 illustrates an elbow 8 in a pipe length 1, which has its free end cold formed to decrease its diameter and create a light-version hose stem. Other connecting structures can be secured, especially by welding, to joining pipe 5, even in the elbowed forms illustrated in FIGS. 2 and 3. Examples of such structures are the sealing head 9 illustrated in FIG. 4, the connecting branch 10 in FIG. 5, and the flange connector 11 in FIG. 6. Sealing head 9, connecting branch 10, and flange connector 11 can also be manufactured separately if desired and butt welded to the free end of joining pipe 5. It is, however, also possible to make the free end of joining pipe 5 itself the sealing head 9, connecting branch 10, or flange connector 11, eliminating the need for welding.

FIG. 7 illustrates another embodiment of a hose stem 2 with a stem end 3, a securing componet 4, and a joining pipe 5 also created in one piece with or cold formed onto it. A hose stem of this type can be manufactured and stocked in comparatively large quantities. It can be provided, by butt welding for example, with a flange connector 11 as illustrated in FIG. 8 to produce a specially manufactured saleable hose stem.

FIG. 9 illustrates still another hose stem 2.

Whereas the hose stems previously specified herein are manufactured from a length 1 of pipe that has a round inside cross-section and a round outside cross-section, a pipe length 12 of the type illustrated in FIG. 10 can also be employed, with a round inside cross-section 13 and a hexagonal outside cross-section 14. A pipe length 12 of this type can be cold formed into hose stems of a wide range of shapes, like those illustrated by way of example in FIGS. 11, 12, and 13. The pipe length illustrated in FIG. 11 is cold formed in the vicinity of its joining pipe into another hexagonal cross-section 15 with comparatively smaller dimensions to preliminarily form a connecting branch 10 with a hexagonal cross-section 15 of the type illustrated as a finished product in FIG. 14. The embodiment illustrated in FIG. 12 retains a short length of joining pipe 5. The unformed area of joining pipe 5 in the form of hexagonal cross-section 14 can then later be formed into a sealing head 9 (FIG. 4) for example. The section of the embodiment illustrated in FIG. 13, which is also a semifinished product, that corresponds to joining pipe 5 can also be reprocessed later into a connecting branch 10 (FIG. 5) by cold forming or machining. Whereas the method of manufacturing the embodiments previously specified herein always commences with cold forming, FIGS. 15 through 19 illustrated embodiments that commence with machining, with turning for example. This method also employs a length 1 of pipe that is preliminary machined to create a pipe length 1, whereas the rest 16 of the pipe length is cold formed, as will be evident from FIGS. 18 and 19, finally resulting in the finished product in the form of a hose stem 2 with a sealing head 9 shaped onto it as illustrated in FIG. 19. FIGS. 16 and 17 illustrate embodiments like those in FIG. 15, but with another type of sealing head 17 (FIG. 16) and with a connecting branch 10 (FIG. 17). The semifinished pieces illustrated in FIGS. 16 and 17 can be further processed in exactly the same way as illustrated in FIGS. 18 and 19 in relation to the semifinished piece illustrated in FIG. 15.

We claim:

1. Method of manufacturing a hose stem for hydraulically loaded friction fittings or threaded fittings with a stem end that a hose can fit over, a securing component that accepts a connection, and a joining pipe, comprising the steps: shaping an end surface of the stem to position the hose securely and forming a groove in said securing component for securing the connection; cold forming togehter said stem end, securing component, and joining pipe out of a single one-piece continuous length of pipe; and shaping said end of the hose stem out of the length of pipe by decreasing the pipe diameter; and shaping said groove in said securing component by reducing the diameter of said continuous length of pipe; said shaping and cold forming comprising applying radial forces to the exterior of said length of pipe, said shaping and cold forming producing walls of varying thickness in said length of pipe.

2. A method of defined in claim 1, wherein said length of pipe remains unchanged in the vicinity of said joining pipe.

3. A method as defined in claim 1, including the step of shaping a free end of said joining pipe by reducing the diameter of said joining pipe, said length of pipe being substantially heavy pipe.

4. A method as defined in claim 1, wherein said pipe length has an hexagon-shaped cross-section.

5. A method as defined in claim 1, wherein said pipe length is shaped initially into a semi-finished piece; and finish-machining connecting means on said pipe length in the vicinity of said joining pipe.

6. A method as defined in claim 1, wherein said cold forming step comprising a swaging step.

7. A method as defined in claim 1, wherein said cold forming step comprises a rolling step.

8. A method as defined in claim 1, wherein said cold forming step comprises drawing through cones.

9. A method as defined in claim 1, wherein said cold forming step comprises swaging; said pipe length having an outer hexagon-shaped cross-section, said joining pipe having a free end, cold forming said free end of said joining pipe, and machining thereafter the cold formed free end of said joining pipe to produce connecting means; shaping initially said pipe length into a semi-finished piece; and finish-machining said connecting means in the vicinity of said joining pipe.

10. A method as defined in claim 1, wherein said joining pipe has a free end; cold forming said free end of said joining pipe; and machining thereafter the cold formed end of said joining pipe to produce a connecting means.

11. A method as defined in claim 10, wherein said connecting means comprises a sealing head.

12. A method as defined in claim 1, wherein said securing component has an end comprising said joining pipe with connecting means.

13. A method as defined in claim 12, wherein said connecting means comprises a sealing head.

14. A method as defined in claim 1, including the step of shaping a connecting means on said pipe length, and cold forming thereafter the remainder of said pipe length.

15. A method as defined in claim 14, wherein said connecting means comprises a sealing head.

* * * * *